United States Patent [19]

Massy

[11] Patent Number: 4,766,779
[45] Date of Patent: Aug. 30, 1988

[54] HYDROSTATIC TRANSMISSION ASSEMBLY AND METHOD OF INCREASING THE TORQUE AND SPEED RANGE THEREOF

[75] Inventor: Donald Massy, Concord, Calif.

[73] Assignee: Fabco Automotive Corporation, Oakland, Calif.

[21] Appl. No.: 586,168

[22] Filed: Mar. 5, 1984

[51] Int. Cl.$^4$ .............................................. F16H 47/02
[52] U.S. Cl. ......................................... 74/733; 74/862
[58] Field of Search .................... 74/731, 732, 733; 60/327

[56] References Cited

U.S. PATENT DOCUMENTS

| | | | |
|---|---|---|---|
| 3,710,647 | 1/1973 | Dach et al. | 74/731 X |
| 3,752,011 | 8/1973 | Casey et al. | 74/731 |
| 3,765,271 | 10/1973 | Dach et al. | 74/731 |
| 4,080,850 | 3/1978 | Bubula et al. | 74/731 X |
| 4,082,013 | 4/1978 | Dornfeld et al. | 74/859 X |
| 4,131,035 | 12/1978 | Mizuno et al. | 74/866 |
| 4,185,521 | 1/1980 | Beals | 74/733 X |
| 4,193,323 | 3/1980 | Bubula et al. | 74/733 |
| 4,229,998 | 10/1980 | Mizuno et al. | 74/866 X |
| 4,246,806 | 1/1981 | Reynolds et al. | 74/731 X |
| 4,253,347 | 3/1981 | Mizuno et al. | 74/862 |
| 4,348,863 | 9/1982 | Taylor et al. | 60/327 |

FOREIGN PATENT DOCUMENTS

| | | | |
|---|---|---|---|
| 2629977 | 1/1978 | Fed. Rep. of Germany | 74/745 |
| 7712073 | 6/1979 | Sweden | 74/731 |

*Primary Examiner*—Leslie A. Braun
*Assistant Examiner*—Dwight G. Diehl
*Attorney, Agent, or Firm*—Flehr, Hohbach, Test, Albritton & Herbert

[57] ABSTRACT

A hydrostatic transmission assembly is disclosed in which a variable displacement hydraulic pump is coupled to drive a variable displacement hydraulic motor. The output shaft of the motor in turn is coupled to the input of a mechanical transmission having a gear change ratio substantially equal to the hydraulic motor displacement (stroke) ratio. Control of the shifting of the mechanical transmission and the stroking or destroking of the motor is provided. When the output shaft of the transmission reaches a predetermined sensed speed proximate the torque and speed limit of the pump and motor, the mechanical transmission is simultaneously shifted as the motor is fully stroked or destroked to enable pressure surge-free and torque peak-free extension of the torque and speed range of the transmission assembly. A method is also disclosed in which the torque and speed range of the hydrostatic transmission is substantially increased by coupling a mechanical transmission to a hydrostatic drive and simultaneously shifting the transmission while the hydraulic motor portion of the drive is either stroked or destroked.

15 Claims, 3 Drawing Sheets

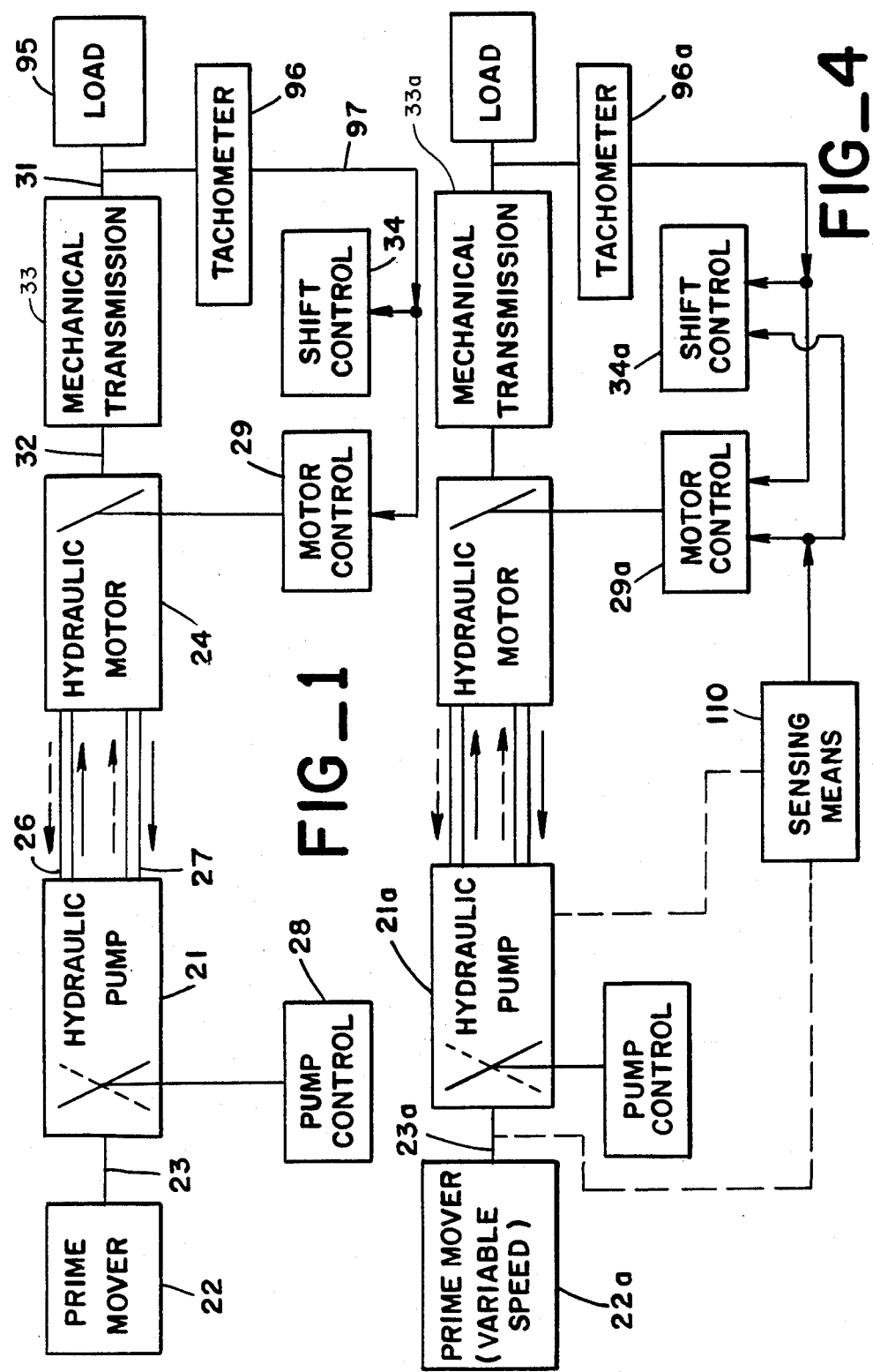

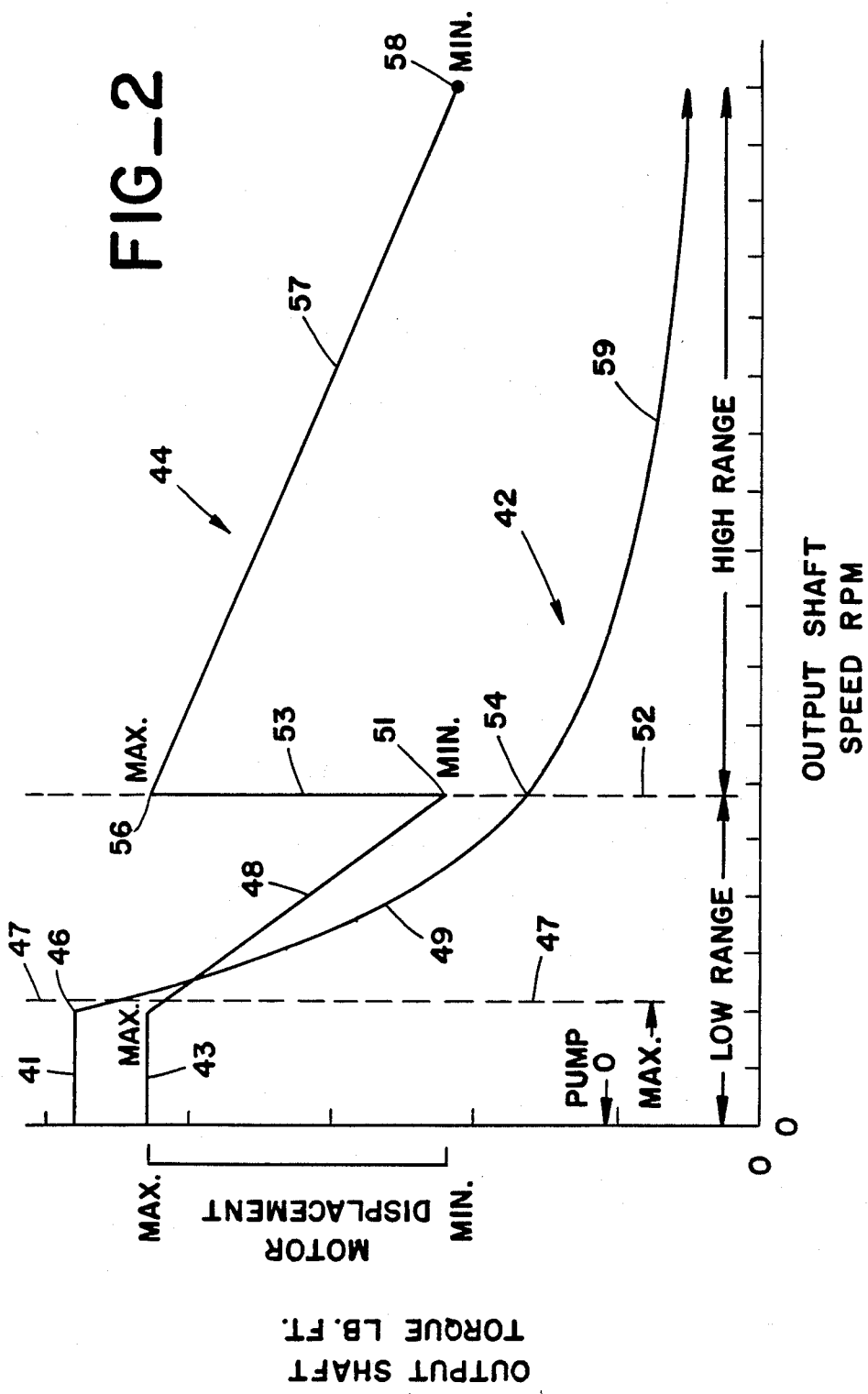

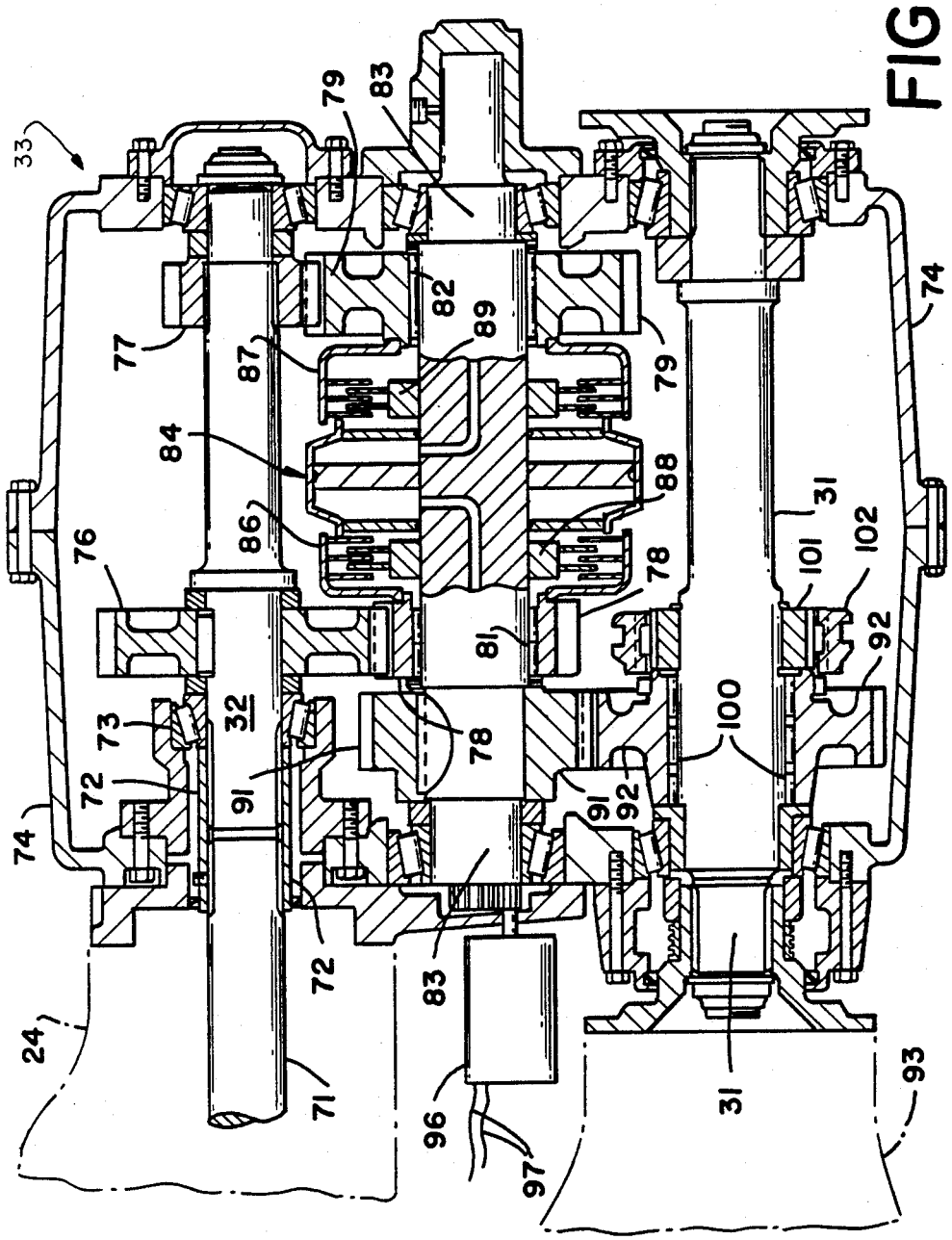

HYDROSTATIC TRANSMISSION ASSEMBLY AND METHOD OF INCREASING THE TORQUE AND SPEED RANGE THEREOF

BACKGROUND OF THE INVENTION

The present invention relates, in general, to hydrostatic transmission assemblies, and more particularly to a method and apparatus for increasing and extending the torque and speed range of a hydrostatic transmission.

Hydrodynamic transmissions have a relatively wide range of speed and torque ratios, and they are, accordingly, readily adapted for use in automobiles and trucks. Hydrostatic transmissions or drives, by contrast, have heretofore had a limited range of speed or torque output, and have accordingly been more commonly used in special purpose vehicles, such as tracked vehicles. If the range of the torque and/or speed ratio of a hydrostatic drive or transmission could be increased, there are numerous additional applications to which such drives could be put with attendant substantial advantage. Hydrostatic drives, for example, provide infinite control of output speed, regardless of engine speed. Thus, a vehicle requiring power to run auxillary equipment mounted on the vehicle and to drive the vehicle wheels simultaneously can be driven with one engine.

Prior art hydrostatic transmission assemblies have included manually shiftable transmissions which can be used to change the gear reduction ratio between the hydraulic motor of the hydrostatic portion of the transmission and the drive wheels or load. Such transmission assemblies, however, have required that the vehicle be stopped in order to shift to a new drive range. Another prior art approach has been to employ a hydrostatic transmission and a power shift apparatus similar to an automatic transmission. Such transmission assemblies have not included any means for sychronous shifting, with the result that the system experiences serious hydraulic pressure surges and momentary torque peaks.

A hydrostatic transmission assembly is disclosed in U.S. Pat. No. 4,192,199 in which a mechanical transmission is coupled to a hydrostatic transmission and an attempt has been made to address the problem of hydraulic pressure surges and torque peaks. The hydrostatic transmission employs a variable displacement motor. Upon shifting of the mechanical transmission, feedback from the load is isolated from the pump control circuit, and the pump is stroked or destroked during the shift. While attempting to control the pump during shifting of the mechanical transmission can eliminate hydraulic pressure surge problems, the overall transmission assembly still has a relatively limited speed and torque range. Moreover, the hydraulic pump, which has an infinite torque ratio, must be controlled by a relatively sophisticated control circuit to attempt to minimize surges, and the system is not inherently synchronized so that failures in the control circuit will produce surges and peaks.

Other attempts have been made to combine the hydrostatic drives with mechanical gear assemblies or transmissions. U.S. Pat. Nos. 3,620,130 and 3,300,000 also are illustrative of hydrostatic drives which included variable displacement pumps and variable displacement motors that have been combined with mechanical transmissions having involved planetary gear trains. In U.S. Pat. No. 3,834,164, a controller having variable volume has been added to the hydrostatic drive. Another approach shown in the prior art is to employ a variable displacement pump with a fixed displacement motor and provide either a specialized control mechanism or a mechanical gear assembly coupled to the motor to achieve various goals. U.S. Pat. Nos. 4,363,247, 4,005,577, 3,302,478 and 2,543,584 are typical of such approaches. In U.S. Pat. No. 4,319,500 a gear train is interposed between the hydraulic pump and the motor, while in U.S. Pat. No. 3,612,202 multiple axles are employed to overcome the relatively limited torque range inherent in the hydrotatic drive system. Finally, U.S. Pat. No. 3,338,115 illustrates a hydrokinetic drive.

While the above set forth prior art hydrostatic drive assemblies or systems have enabled the attainment of various advantages, they still do not afford a simple yet effective apparatus or method for the extension of the relatively limited torque and speed range inherent in a hydrostatic transmission. To the extent such systems do extend the torque or speed range, the improvement in range tends to be relatively limited. Alternatively, the system becomes extremely complex and often directed toward performance characteristics which will not make the drive system suitable for applications in which a high range of torque and speed is required.

OBJECTS AND SUMMARY OF THE INVENTION

A. Objects of the Invention

It is an object of the present invention to provide a hydrostatic transmission assembly which has a greatly increased torque and speed range.

It is a further object of the present invention to provide a hydrostatic transmission assembly in which the advantage of the hydrostatic transmission and the advantages of a mechanical transmission are both available to the user.

Another object of the present invention is to provide a hydrostatic transmission assembly having an enhanced speed and torque ratio which is relatively simple in its construction and is easy to operate.

A further object of the present invention is to provide a method for increasing the torque and speed range of a hydrostatic drive which is suitable for use on a wide range of vehicles and can be employed by relatively unskilled personnel.

The hydrostatic transmission assembly and method of the present invention have other objects and features of advantage which will become more apparent from and are set forth in more detail in the following detailed description of the preferred embodiments and the accompanying drawing.

B. Summary of the Invention

The hydrostatic transmission assembly of the present invention includes a variable displacement hydraulic pump and a variable displacement hydraulic motor connected to the pump to be driven thereby. A mechanical transmission is coupled to be driven by the motor and includes a shiftable gear train formed to change the speed ratio between the input and output of the mechanical transmission. The improvement in the hydrostatic transmission comprises, briefly, control means for the hydraulic motor and for the mechanical transmission which are formed and operatively connected for substantially simultaneous variation of the displacement of the hydraulic motor over the full stroke of the motor and shifting of the transmission gear train, with the motor displacement amount and direction of displacement being matched to the gear train shift to maintain substantially the same speed of the output of the assembly before and after shifting. This simultaneous shifting of the mechanical transmission and matched stroking or destroking of the hydraulic motor preferably occurs at a predetermined speed of the output close to the maximum output speed obtainable by fully stroking the pump and destroking the motor so that the hydrostatic transmission has a greatly increased torque and speed range. The matched shifting and motor displacement is substantialy free of hydraulic pressure surges and mechanical torque peaks.

The method of increasing the torque and speed range of the hydrostatic drive of the present invention includes the steps of employing a drive having a mechanical transmission with a torque ratio substantially equal to the displacement ratio of the hydraulic motor, and proximate the limit of the speed range of the hydrostatic drive, substantially simultaneously shifting the transmission and varying, in an opposite direction, the displacement of the motor over the full displacement range of the motor, which is matched to the mechanical transmission to effect a smooth, shock-free change in the torque and speed range of the drive. Shifting and stroking or destroking occurs at about the limit of the range of the drive so as to enable further speed controlled stroking or destroking of the motor to increase the speed and torque range of the overall transmission.

DESCRIPTION OF THE DRAWING

FIG. 1 is a schematic representation of a hydrostatic transmission assembly constructed in accordance with the present invention.

FIG. 2 is a graphical representation of the output shaft torque and hydraulic motor displacement as a function of output shaft speed for a hydrostatic transmission assembly constructed in accordance with FIG. 1.

FIG. 3 is a side-elevational view in cross-section of a mechanical transmission which is suitable for use with the hydrostatic transmission assembly of FIG. 1.

FIG. 4 is a schematic representation of an alternative embodiment of the hydrostatic transmission assembly of the present invention.

DESCRIPTION OF THE PREFERRED EMBODIMENT

The present invention employs the substantial advantage of the positive transmission of power, which a hydrostatic transmission affords, while at the same time overcomes the problem of relatively limited torque and speed ratio, which has heretofore been characteristic of a hydrostatic transmission. The increase in the torque and speed ratios of the hydrostatic transmission of the present invention is accomplished, broadly, by combining a mechanical transmission with the hydrostatic transmission and, when the limit of torque and speed range inherent in the hydrostatic transmission is reached (e.g., after full pump stroking and motor destroking), substantially simultaneously shifting the speed ratio of the mechanical transmission and stroking the motor by an equal or matched amount so that a surge-free, torque peak-free shift is achieved. The motor can, after the shift, be destroked again to increase the speed and torque range of the overall transmission assembly.

In FIG. 1 the transmission of the present invention can be seen to include a variable displacement hydraulic pump 21 formed for coupling to a prime mover 22, for example, through shaft 23. Mounted in fluid connection with pump 21 through conduits 26 and 27 is a variable displacement hydraulic motor 24.

In order to control displacement of the swashplates in the hydraulic pump and motor, swashplate control means 28 and 29 are coupled to the pump and motor, respectively. As is also common for hydrostatic drives, pump 21 and swashplate control 28 are formed for variation of the displacement of the pump swashplate from zero to a maximum in one direction and from zero to a maximum in an opposite direction so as to enable driving of the motor in opposite directions to provide a reverse feature for the drive. Thus, pump swashplate control 28 can be operated between zero and a plus or minus a maximum displacement value. The arrows proximate conduits 26 and 27 indicate flow in a forward direction in solid lines and in a reverse direction in dotted lines.

As will be described more completely hereinafter, pump swashplate control 28 is preferably a manual control which is used by the operator of the drive (or vehicle). Usually, the prime mover 22 is operated at a constant speed, although that is not essential to the drive of the present invention. In order to start driving the transmission assembly output shaft 31, pump 21 is displaced from zero displacement in either a positive or negative direction, depending upon whether or not forward or reverse driving is desired. Thus, the pump control 28 is normally started from the fully destroked (neutral or zero displacement) position and the pump swashplate is then stroked or displaced toward maximum stroke in either the positive or negative direction.

Hydraulic motor 24 is controlled by motor control 29 in a manner similar to that of pump 21, except that the hydraulic motor is constructed so that the motor swashplate can be moved between a maximum stroke to a minimum stroke, which is usually a fraction of the maximum stroke, for example, $\frac{1}{3}$ of maximum. Control 29 initially positions the swashplate in motor 24 in the fully stroked (maximum displacement) position. This produces an output from the motor shaft 32 in which the speed is at the minimum end of the speed range and the torque is at the maximum end of the torque range.

In a sequence which is typical of all hydrostatic drives, pump 21 is displaced from the neutral position to the fully stroked position while the hydraulic motor is maintained in a fully stroked condition. This stroking of pump 21 causes an increase in the speed of motor output shaft 32 and transmission assembly output shaft 31, both without any appreciable reduction in torque in these shafts. Once the pump is fully stroked, motor control 29 begins to destroke motor 24, with the result that the speed of shafts 32 and 31 increase further and the torque at such shafts is reduced. When motor 24 is fully destroked, the hydrostatic drive has reached the limit of the speed range which it is capable of on its own. For typical commercially available hydrostatic transmissions this may be a ratio of approximately 3 to 1. Since mechanical transmissions typically have a speed and torque range of 9 or 10 to 1, the hydrostatic drive or transmission assembly thus far described falls far short of the speed and torque range which would be desirable for conventional, road-operated vehicles.

In the improved hydrostatic transmission assembly of the present invention a substantially increased speed and torque range is achieved by coupling a mechanical transmission, generally designated 33, to motor 24, which transmission includes shiftable gear train means having a speed change ratio approximately equal or matched to the stroke ratio or range of motor 24. Additionally, the mechanical transmission is controlled so that gear change or shift control 34 is operated substantially simultaneously with motor swashplate control 29 when motor 24 reaches the limit of the speed range which can be achieved by the pump and motor alone.

Thus, in an accelerating sequence, pump 21 is first fully stroked and motor 24 is fully destroked, at which point the hydrostatic drive elements are at the speed limit of their range. Gear change control 34 and motor control 29 are then simultaneously operated to shift the mechanical transmission from a low speed range to a high speed range, while the hydraulic motor is simultaneously returned to full stroke. Since the mechanical transmission 33 was selected to have a gear ratio equal to the displacement ratio of motor 24, transmission assembly output shaft 31 will be at substantially the same speed and torque levels before and after the simultaneous shifting of the mechanical transmission and stroking of the hydraulic motor. With the mechanical transmission in high speed range, motor 24 can then be destroked again to further increase the speed of shaft 31, with attendant reduction in torque at the output shaft. The overall transmission assembly, therefore, can now have a torque and speed range on the order of 9 to 1, or greater.

FIG. 2 illustrates the speed versus torque profile 42 and motor displacement versus speed profile 44 of the hydrostatic transmission of FIG. 1. In the zero speed, zero torque condition, pump 21 is fully destroked or has zero displacement, hydraulic motor 24 is at maximum displacement, and mechanical transmission 33 is in the low speed range. Engine 22 may be operated at a speed which may vary, but for simplicity of illustration and in many applications engine 22 is operated at a constant speed. The operator or person controlling the transmission adjusts pump control 28 so as to advance hydraulic pump 21 toward maximum displacement. This is indicated by flat segment 41 of the torque versus speed curve. Hydraulic motor 24 remains at maximum displacement, as indicated by section 43 of motor displacement curve 44. In order to enable a control function which will be described herinafter in more detail, at a position 46 short of maximum pump displacement 47, controller 29 automatically begins to destroke motor 24, as indicated by portion 48 of motor displacement-speed curve 44.

The rate at which motor 24 is destroked is controlled by controller 29, which in turn is coupled for input from tachometer 96 mounted to sense a speed which is proportional to the output of the transmission. Most preferably tachometer 96 is coupled to an intermediate output shaft in advance of load 95, as will be more fully set forth. Tachometer 96 can also be mounted to sense the speed of shaft 32, which will be proportional to the speed of shaft 31 by a ratio determined by the gear ratio of transmission 33 which preferably lies within the range of 2 to 1 to 5 to 1. Means must be provided for sensing the gear ratio in which transmission 33 is operated if the tachometer is mounted to sense the speed of input shaft 32 so that the speed signal from the tachometer will be proportional to the output shaft speed.

As the tachometer senses the speed of shaft 31 along curve section 49 of the speed curve, it causes controller 29 to destroke hydraulic motor 24 to minimum 51 in accordance with curve portion 48 of the displacement curve. Vertical dashed line 52 represents the end of the low speed range of the hydrostatic drive portion of the transmission assembly. Thus the speed and torque ratio in the low speed range is approximately 3:1, which is typical for hydrostatic drives.

In the improved transmission of the present invention a gear change is effected once the limit of the low speed range 52 is reached. This gear change results by substantially simultaneously shifting gear change controller 34 to the high speed gear while motor 24 is simultaneously fully stroked, as indicated by portion 53 of the displacement curve. The speed and torque at limit line 52, as indicated by point 54, however, is not changed because the mechanical transmission gear ratio has been selected to be substantially equal to the ratio of the maximum to minimum stroke in hydraulic motor 24. Thus, when motor 24 is fully stroked during the shift operation to point 56, the gear change equals the stroking, but is in the opposite direction, so that a smooth torque versus speed curve at shift point 54 is achieved.

After the shift and motor stroking, the motor can then again be gradually and continuously destroked, as controlled by tachometer input and shown by displacement curve portion 57 and speed curve portion 59. The transmission assembly of the present invention is operated in a reverse manner when decelerating from minimum stroke point 58 toward zero output shaft speed. At the lower limit of the high speed range, namely dashed line 52, the motor is destroked fully while mechanical transmission is down shifted.

Referring now to FIG. 3, the details of construction of a mechanical transmission suitable for coupling to the hydrostatic drive portion of the transmission assembly of the present invention can be described in greater detail. Hydraulic motor 24 includes an output shaft 71 which is coupled by a sleeve 72 to transmission input shaft 32. Input shaft 32 is rotatably mounted by bearings 73 in transmission housing 74. Fixedly mounted for rotation with input shaft 32 are at least two gears 76 and 77. These gears in turn are coupled to drive gears 78 and 79, which are mounted for rotation by bearing assemblies 81 and 82 with respect to intermediate transmission shaft 83.

In order to enable selective coupling of either gear 78 or gear 79 to shaft 83 to drive the same, clutch means 84 is preferably provided. The clutch is constructed in a standard manner and includes an annular element 86 which is coupled to rotate with gear 78 and an annular element 87 which is coupled to rotate with gear 79. On pressurizing the clutch, one can selectively drive the clutch plates together so that annular element 86 will rotate clutch member 88, which is keyed to drive shaft 83 or will rotate clutch member 89, which is also keyed to drive shaft 83.

Upon actuation of clutch 84, therefore, the clutch can be used to couple small diameter gear 78 through members 86 and 88 to drive shaft 83. This is the low-speed gear range. Alternatively, the clutch can be released, so that member 88 is no longer driven, and engaged on the opposite side of the clutch, so that annular member 87 drives member 89 and shaft 83, to provide the high-speed range of the mechanical transmission.

Also fixedly mounted to intermediate shaft 83 is a gear 91 which is coupled to drive gear 92. It is preferable that drive gear 92 be rotatably mounted to output shaft 31 to enable the mechanical transmission to be disconnected from the output shaft, for example, to permit towing of a vehicle having the transmission assembly of the present invention. Thus, as illustrated in FIG. 3, gear 101 is fixedly mounted to shaft 31 and an axially shiftable member 102 can be selectively used to couple gear 92 to gear 101 and output shaft 31. As shown, member 102 is disengaged from gear 92. Most typicallly, shifting of member 102 would be manually accomplished. As will be appreciated when a disconnect feature is not desired, gear 92 can be fixedly mounted to output shaft 31. Shaft 31 can in turn be coupled by a sleeve or the like to a differential unit, generally shown at 93. It will be appreciated that other mechanical transmission configurations will be suitable for use in the hydrostatic transmission assembly of the present invention. The mechanical transmission structure per se is not regarded as being a novel portion of the present invention.

In FIG. 3 tachometer 96, providing speed sensing means, is coupled to sense the speed rotation of intermediate output shaft 83, which rotates at a speed that is proportional to the speed of output shaft 31. Accordingly, within the meaning of the present invention the sensing of speed off the intermediate shaft 83 is also a sensing of a speed proportinal to the speed of output shaft 31. The output of tachometer 96 is coupled by electrical conductors 97 to the gear change control 34 and hydraulic motor swashplate control 29 so that when the predetermined speed at line 52 is sensed by the sensing means, speed signals to controls 29 and 34 simultaneously cause gear changing and motor swashplate stroking or destroking.

An automatic shifting at the limit of the high and low speed ranges, namely at speed 52, allows the operator to control the overall transmission system by means of manually controlling the pump. As long as the pump is close to maximum displacement, the pump will produce sufficient fluid output to drive the motor toward the high speed range. Thus, once pump 21 is stroked to a predetermined level, in this case point 46 (or above to line 47), hydraulic motor 24 will be controlled by motor control 29 and tachometer 96 in a manner causing destroking of the motor. In the event that pump displacement should fall below the point 46 and there is an absence of sufficient fluid output, controller 29 will sense starvation of the motor and automatically will start to stroke the motor at a rate controlled by the output speed sensed by tachometer 96. This produces the deceleration sequence. The automatic simultaneous shifting occurs at predetermined speed 52, whether accelerating or declerating, as a result of the tachometer indicating that that speed has been reached, but control of whether or not the motor is being stroked or destroked by controller 29 is determined by whether or not pump 21 is driving or starving motor 24, i.e., stroked beyond a predetermined level, such as point 46 proximate and below to maximum pump stroke 47.

While the operator must operate pump controller 28 by constantly adjusting the same above and below point 46 so as to achieve a steady speed, this is not believed to be a significant problem because the transmission of the present invention will normally be under a significant inertial load 95, for example, a vehicle, which will tend to reduce the problem of constant "hunting." A driver should be easily able to maintain any constant speed on the curve 42 by slightly adjusting the pump stroking about point 46, much as the driver of a conventional automobile maintains a constant speed by slightly adjusting the fuel pedal.

It is preferable that level 46 be selected so that it is relatively near the maximum pump displacement so that there is a range about which the operator can adjust pump displacement to control speed of the output shaft.

FIG. 4 illustrates a modified form of the transmission assembly in which the shift point or speed 52 of FIG. 2 can be modulated. As shown sensing means 110 is provided which may be coupled to one of engine 22a and pump 21a so as to provide a feedback signal to motor controller 29a and gear change control 34a. If, for example, engine 22a is a variable speed engine, sensing means 110 can be a second tachometer coupled to shaft 23a and providing a speed signal which, when combined with the speed signal from first tachometer 96a in controls 29a and 34a shifts point 52, for example, in an upward direction for high engine speeds and a lower direction for low engine speeds.

Feedback means 110 can also be based upon feedback from pump 21a by sensing the degree of stroking of the hydraulic pump. Both engine and pump feedback normally would not be employed at the same time.

It should be noted that stroking and destroking of the hydraulic motor has been illustrated by a continuous straight line curve 44, but it is also within the scope of the present invention to step or provide finite relatively small increments of motor displacement. Such incremental stroking and destroking would not produce intolerable pressure or torque spikes if the increments are kept reasonably small. Obviously, the increments which are tolerable would vary for the particular transmission.

A hydrostatic transmission constructed in accordance with the present invention can be formed of components which are generally well known in the art. Hydrostatic pumps and motors suitable for use in the present invention are available from many manufacturers. For example, Rexroth Worldwide Hydraulics of Wooster, Ohio, produce variable displacement hydraulic pumps and variable displacement hydraulic motors which can be coupled together to provide the hydrostatic portion of the transmission of the present invention. It is preferable to employ a mechanical transmission as shown in FIG. 3 which is coupled to the output shaft of the hydraulic motor, but it will also be understood that other mechanical transmissions having gear trains formed to enable speed changes of ratio substantially equal to the ratio of the hydraulic motor maximum to minimum displacement can be employed. In this regard, it is noted that if the maximum to minimum motor displacement is 3 to 1, the speed change ratio would be 1 to 3, and the overall torque and speed range of the combined hydrostatic and mechanical transmission would be 9 to 1. As will be appreciated, the smoothness achieved at shift point 52 along the torque versus speed curve will be affected by the degree of matching of the mechanical transmission to the motor stroke ratio, but some mismatching can be tolerated and even accomodated through appropriate clutching. Such a mismatch is not, however, desirable.

As will also be appreciated, it is at least theoretically possible to go through a third or fourth simultaneous speed change and stroking or destroking of the motor so as to continue curve 42. As also will be appreciated, however, there is little practical advantage to the use of such further mechanical gear changes and motor stroking or destroking in most applications.

The control system employed to control the pump stroking can be a conventional hydrostatic transmission controller. The motor controller, however, must be coupled for simultaneous stroking or destroking at the predetermined limit 52 of the low and high speed ranges. For shift modulated systems as shown in FIG. 4 appropriate logic circuity is well known for the integration of signals from multiple sensors to modulate the shift point.

The transmission assembly of the present invention provides a relatively simple, inexpensive and positive manner of extending the speed and torque range of a hydrostatic transmission. It inherently avoids torque and pressure peaks and requires much less complicated control means than systems in which the hydraulic pump is attempted to be controlled to enable coupling to a mechanical transmission. The present transmission can be coupled through a differential to a drive axle or built into the drive axle itself, and it can be employed with both variable speed and fixed speed engines.

What is claimed is:

1. A hydrostatic transmission assembly for use with a prime mover and inCluding a variable displacement hydraulic pump formed for coupling to said prime mover to be driven thereby; a variable displacement hydraulic motor connected in fluid communication with said pump and having a motor output and motor control means connected to enable variation of the displacement of said motor to or from a fully stroked condition and a fully destroked condition to change the speed of said motor output; and a mechanical transmission having a transmission input coupled to said motor, a transmission output, shiftable gear train means coupling said transmission input to said transmission output and formed for change of the speed ratio between said transmission input and said transmission output upon shifting said mechanical transmission, and shift control means connected to enable shifting of said gear train means, wherein the improvement of said assembly comprises:
   said motor being formed to have a known displacement ratio between said fully stroked condition and said fully destroked condition,
   said gear train means being formed for shifting between two transmission output speeds for change of said speed ratio upon shifting by an amount which is substantially matched to the change in output speed of said motor output when said motor is shifted between said fully stroked condition and said fully destroked condition; and
   said motor control means and said shift control means being further formed and operatively connected to said assembly for substantially simultaneous shifting of the displacement of said motor over the full displacement ratio between said fully stroked condition and said fully destroked condition, while shifting of said gear train means between said two transmission output speeds to change said speed ratio in an amount and a direction matching said change in output speed of said motor output.

2. The hydrostatic transmission assembly as defined in claim 1, and
   sensing means coupled to sense a speed proportional to the transmission output speed and formed and coupled to automatically produce said simultaneous shifting of said motor displacement and shifting of said gear train means at a predetermined speed of said transmission output.

3. The hydrostatic transmission assembly as defined in claim 2 wherein,
   said motor control means is formed to destroke said motor toward minimum displacement in the presence of sufficient fluid output from said pump and to stroke said motor toward maximum displacement in the absence of sufficient fluid output from said pump for all speeds of said output other than said predetermined speed.

4. The hydrostatic transmission assembly as defined in claim 3 wherein,
   said pump is formed to provide sufficient fluid output to said motor to produce destroking of said motor toward minimum displacement at a pump displacement level proximate to and lower than maximum pump displacement.

5. The hydrostatic transmission assembly as defined in claim 1 wherein,
   said transmission input is a rotatable transmission input shaft,
   said transmission output is a rotatable output shaft, and
   tachometer means coupled to sense the speed of rotation of a rotating shaft in said assembly rotating at a speed which is proportional to the speed of rotation of said transmission output shaft, said tachometer means being further coupled to said motor control means and said shift control means to provide speed signals thereto, and
   said motor control means and said shift control means being formed for simultaneous displacement and shifting upon receipt of a predetermined speed signal from said tachometer means.

6. The hydrostatic transmission assembly as defined in claim 6 wherein,
   said motor control means is further formed for gradual change of the stroke of said motor at a predetermined rate between maximum and minimum displacement based upon speed signals other than said predetermined speed signal.

7. The hydrostatic transmission assembly as defined in claim 6 wherein,
   said pump includes manually operable pump control means coupled to enable variation of the displacement of said pump.

8. The hydrostatic transmission as defined in claim 1, and
   sensing means formed and coupled to sense speed demand levels made on said transmission output by a load and coupled to said motor control means and shift control means for the communication of speed signals thereto,
   said motor control means and said shift control means being formed for modulation of the speed at which said simultaneous shifting of the displacement of said motor and shifting of said gear train means occurs based upon the receipt of speed signals from said sensing means.

9. The hydrostatic transmission as defined in claim 8 wherein,
   said sensing means includes first tachometer means coupled to said mechanical transmission and second tachometer means coupled to said prime mover.

10. The hydrostatic transmission as defined in claim 8 wherein, said sensing means includes tachometer means coupled to said mechanical transmission and pump displacement sensing means coupled to said pump.

11. The hydrostatic transmission assembly as defined in claim 1 wherein,
said gear train means is formed to provide a change in the torque ratio in the range of about 2 to 1 to about 5 to 1 upon shifting and said motor has a change in motor output speed in the range of about 1 to 2 to about 1 to 5 which is further matched to said change in torque ratio of said gear train means.

12. The hydrostatic transmission assembly as defined in claim 11 wherein,
said gear train means is formed to provide a change in the torque ratio of about 3 to 1 upon shifting and said motor has a change in motor output speed of about 1 to 3 between said fully stroked condition and said fully destroked condition.

13. A method of increasing the torque and speed range of a hydrostatic transmission assembly, said assembly including a variable displacement hydraulic pump coupled to a variable displacement hydraulic motor which in turn is coupled to drive a mechanical transmission having a shiftable gear ratio, said method comprising the steps of:

substantially matching the change between the gear ratios of said transmission and the change in speed of the output of said motor, and substantially simultaneously shifting said transmission and shifting in an opposite direction the displacement of said motor over the full displacement range of said motor to produce hydraulic pressure surge-free and torque peak-free operation of said transmission assembly across the synchronized shifting.

whereby said motor is controlled so as to vary to or from a fully stroked condition and a fully destroked condition.

14. The method of increasing the torque and speed range of a hydrostatic transmission assembly as defined in claim 12, and the additional steps of:
sensing the speed of the output of said assembly; and
automatically effecting said simultaneous shifting upon sensing of a predetermined speed.

15. The method of increasing the torque and speed range of a hydrostatic transmission assembly as defined in claim 13 wherein,
said transmission assembly is mounted to drive a load having inertia, and
employing the inertia of said vehicle to increase the stability of operation of said assembly.

* * * * *